(12) United States Patent
Dodge

(10) Patent No.: US 6,644,445 B2
(45) Date of Patent: Nov. 11, 2003

(54) FLOATING PORT BLOCKER

(75) Inventor: Dean R. Dodge, Saline, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 39 days.

(21) Appl. No.: 09/992,316

(22) Filed: Nov. 19, 2001

(65) Prior Publication Data

US 2003/0094340 A1 May 22, 2003

(51) Int. Cl.[7] .............................................. F16F 13/00
(52) U.S. Cl. ................................................... 188/282.6
(58) Field of Search ........................ 188/322.15, 282.6, 188/266.5, 282.9, 313

(56) References Cited

U.S. PATENT DOCUMENTS

| | | | |
|---|---|---|---|
| 2,060,590 A | * | 11/1936 | Padgett ........................ 188/315 |
| 3,199,636 A | | 8/1965 | de Carbon |
| 3,837,445 A | | 9/1974 | Pierle |
| 3,845,782 A | * | 11/1974 | Nicholls et al. ............ 137/493 |
| 4,060,155 A | | 11/1977 | Duckett |
| 4,088,207 A | | 5/1978 | Kato |
| 4,241,815 A | | 12/1980 | Federspiel |
| 4,298,102 A | | 11/1981 | Nishikawa et al. |
| 4,460,074 A | | 7/1984 | Muller et al. |
| 4,485,900 A | | 12/1984 | Kato et al. |
| 4,749,068 A | | 6/1988 | Sirven |
| 4,765,445 A | | 8/1988 | Komossa et al. |
| 4,819,773 A | | 4/1989 | Ito et al. |
| 4,895,229 A | | 1/1990 | Kato |
| 4,964,493 A | | 10/1990 | Yamaura et al. |
| 4,972,929 A | | 11/1990 | Ivers et al. |
| 5,129,488 A | | 7/1992 | Furuya et al. |
| 5,316,113 A | | 5/1994 | Yamaoka |
| 5,316,114 A | | 5/1994 | Furuya et al. |
| 5,330,132 A | | 7/1994 | Lucienne et al. |
| 5,332,069 A | | 7/1994 | Murakami |
| 5,404,973 A | | 4/1995 | Katoh et al. |
| 5,413,195 A | | 5/1995 | Murakami |
| 5,495,923 A | * | 3/1996 | Bruski et al. ................ 188/268 |
| 5,529,154 A | | 6/1996 | Tanaka |
| 5,709,290 A | * | 1/1998 | Ekert et al. ............ 188/322.15 |

FOREIGN PATENT DOCUMENTS

DE          3041549 A1  *  5/1981

* cited by examiner

Primary Examiner—Jack Lavinder
Assistant Examiner—Xuan Lan Nguyen
(74) Attorney, Agent, or Firm—Harness, Dickey & Pierce, PLC

(57) ABSTRACT

A shock absorber includes a piston assembly having a compression valve assembly and a rebound valve assembly. One of the valve assemblies includes a free floating port blocker disc disposed in a pressure chamber. The blocker disc allows for the low speed bleed flow of fluid in one direction but restricts the low speed bleed flow of fluid in the opposite direction.

12 Claims, 4 Drawing Sheets

FLOATING PORT BLOCKER

FIELD OF THE INVENTION

The present invention relates generally to automotive dampers or shock absorbers which receive mechanical shock. More particularly, the present invention relates to a unique hydraulic valve assembly which allows greater tunability of the shock absorber in both the mode of low speed or low hydraulic fluid flow and the mode of high speed or high hydraulic fluid flow.

BACKGROUND OF THE INVENTION

Shock absorbers are used in conjunction with automotive suspension systems to absorb unwanted vibrations which occur during driving. To absorb these unwanted vibrations, shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the automobile by one of the methods known in the art. Because the piston is able, through valving, to limit the flow of damping fluid between opposite sides of the piston when the shock absorber is compressed or extended, the shock absorber is able to produce a damping force which damps the unwanted vibration which would otherwise be transmitted from the unsprung portion to the sprung portion of the automobile. In a dual tube shock absorber, a fluid reservoir is defined between the pressure tube and the reserve tube. When a full displacement piston valving system is used, the fluid reservoir is in direct communication with the lower portion of the working chamber defined by the pressure tube (the area below the piston). All damping forces produced by the shock absorber are the result of piston valving when a full displacement valving system is used. The greater the degree to which the flow of fluid within the shock absorber is restricted by the piston, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant for the main springs of the vehicle as well as the spring constant for the seat and tires and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending on the speed or acceleration of the piston within the pressure tube. Because of the exponential relation between pressure drop and flow rate, it is a difficult task to obtain a damping force at relatively low piston velocities, particularly at velocities near zero. Low speed damping force is important to vehicle handling since most vehicle handling events are controlled by low speed vehicle body velocities.

Various prior art systems for tuning shock absorbers during low speed movement of the piston create a low speed bleed orifice which provides a bleed passage which is always open across the piston. This bleed orifice can be created by utilizing orifice notches positioned in one or both of the compression and extension flexible discs adjacent to a respective sealing land in the piston or by utilizing orifice notches located directly on the respective sealing land itself. The limitations of these designs is that an orifice notch on the extension flexible disc or sealing land will affect the shock absorber during a compression stroke due to the fact that the orifice is always open. In a similar manner, an orifice notch on the compression flexible disc or sealing land will affect the shock absorber during an extension stroke due to the always open nature of the orifice.

The continued development of shock absorbers includes the development of low speed tunability systems which can separate the compression low speed tuning from the extension stroke and/or separate the extension low speed tuning from the compression stroke. The separation of these tuning systems allows the damper designer the ability to tune each system independently of the other system.

SUMMARY OF THE INVENTION

The present invention provides the art with a method for isolating the compression bleed system from the extension stroke and/or for isolating the extension bleed system from the compression stroke. The present invention provides a floating port blocker disc that fits in the pressure area/channel of the piston valves. Neither the inside or outside diameters of the floating port blocker disc are fixed. Thus, the disc is free to float within the channel to allow the bleed flow in one direction but to act as a check valve for prohibiting fluid flow in the opposite direction. In addition, the floating port blocker disc provides high speed port restriction that is a function of pressure. Thus, the port blocker disc acts as a variable high speed orifice.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
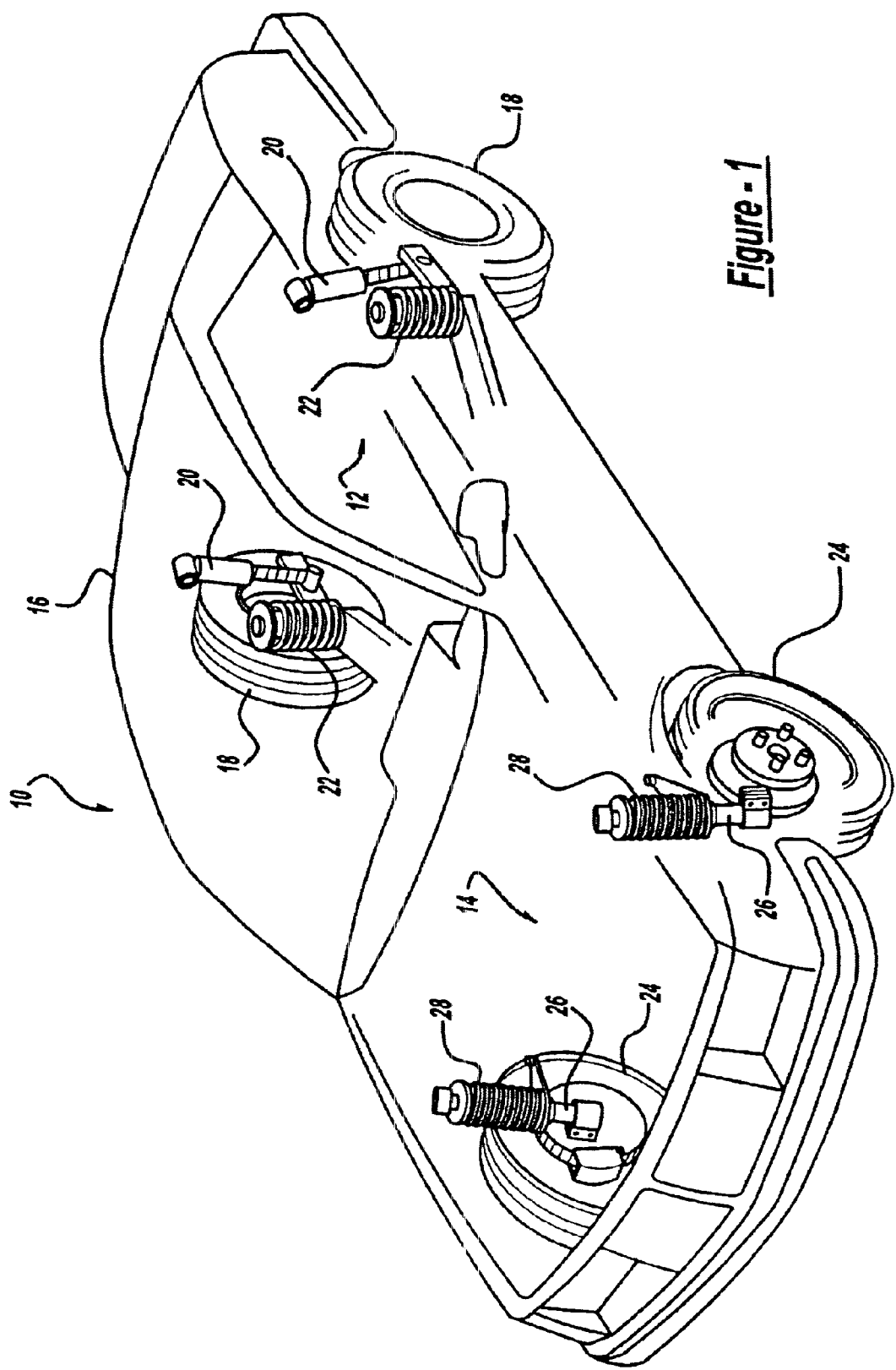
FIG. 1 is an illustration of an automobile using the floating port blocker disc in accordance with the present invention.

Referring now to the drawings in which like reference numerals designate like or corresponding parts throughout the several views, there is shown in FIG. 1 a vehicle incorporating a suspension system having the floating port blocker disc in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Figure 2:
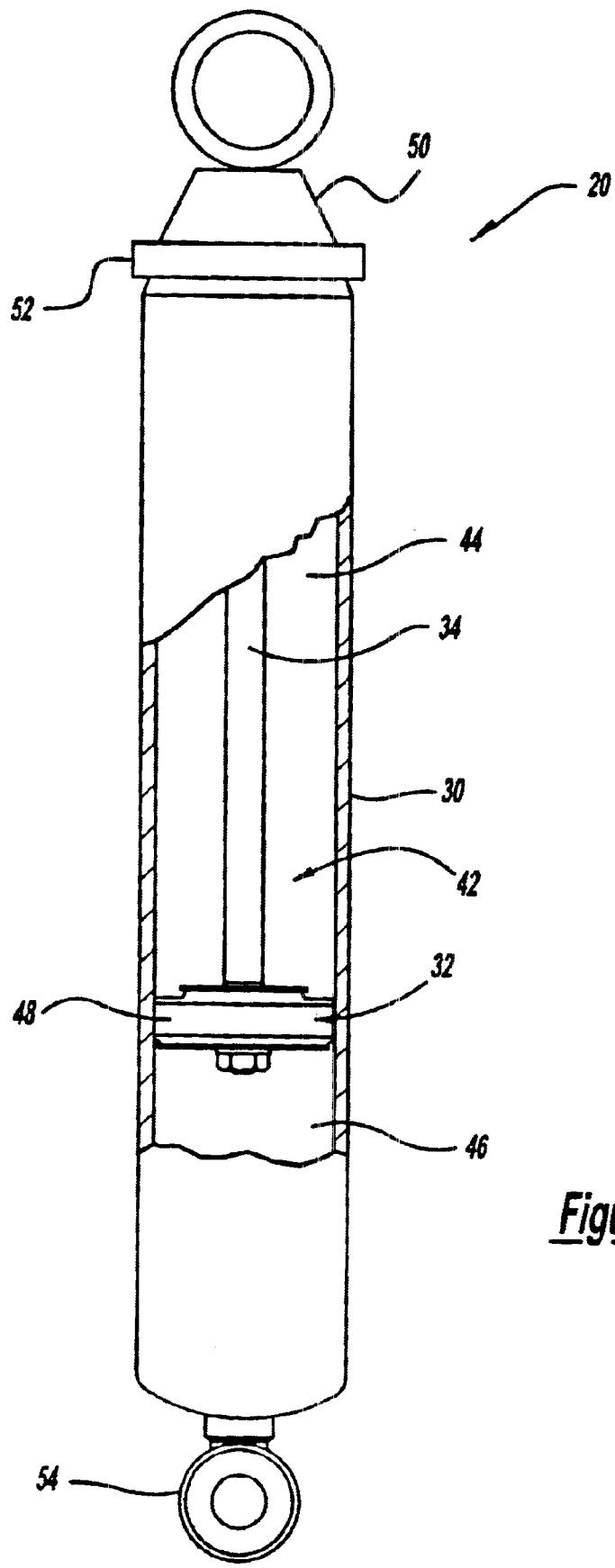
FIG. 2 is a side view, partially in cross-section, of a shock absorber incorporating the floating port blocker disc in accordance with the present invention.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. Pressure tube 30 is filled with fluid and it includes a fitting 54 for attachment to the unsprung portion of the vehicle. Thus, suspension movements of vehicle 10 will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

The present invention is directed to a unique piston assembly 32. Piston assembly 32 comprises a piston 60, a compression valve assembly 62 and an extension valve assembly 64. Piston 60 is secured to piston rod 34 and it defines a plurality of compression fluid passages 66 and a plurality of extension fluid passages 68.

Figure 3:
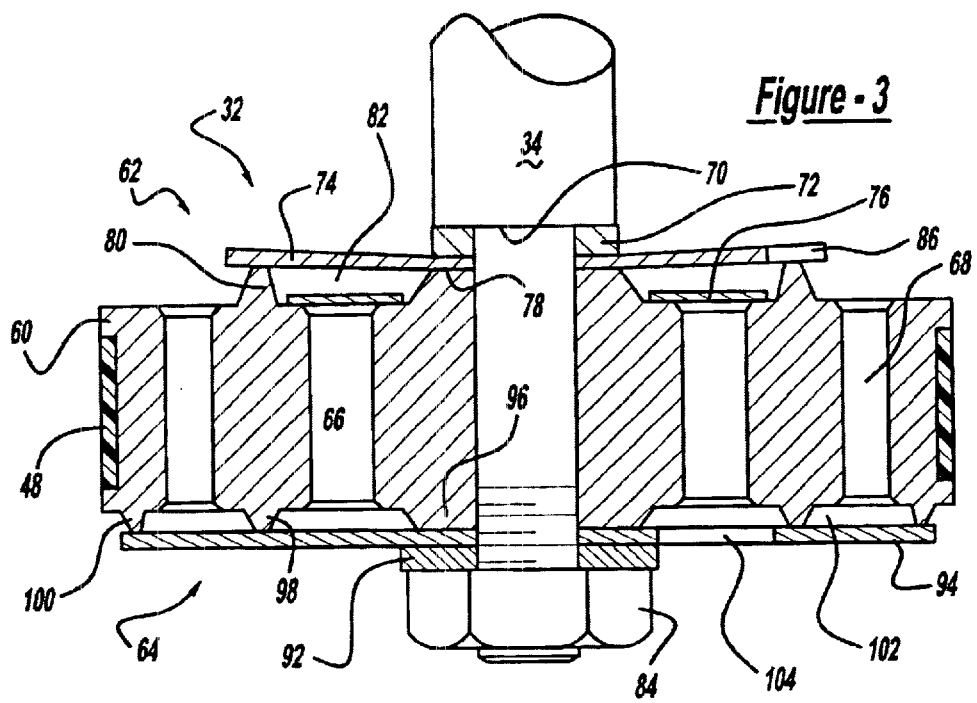
FIG. 3 is an enlarged side elevational view, partially in cross-section, of the piston assembly for the shock absorber shown in FIG. 2 shown in the closed, no reverse flow mode.
Figure 4:
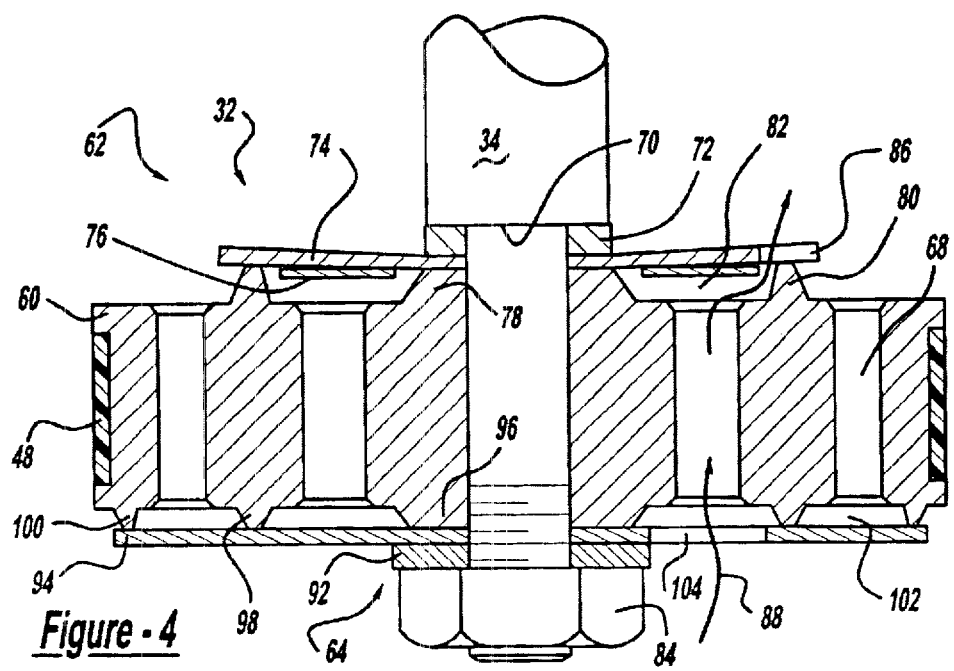
FIG. 4 is an enlarged side elevational view, partially in cross-section, of the piston assembly for the shock absorber shown in FIG. 2 shown in an open, low flow mode.
Figure 5:
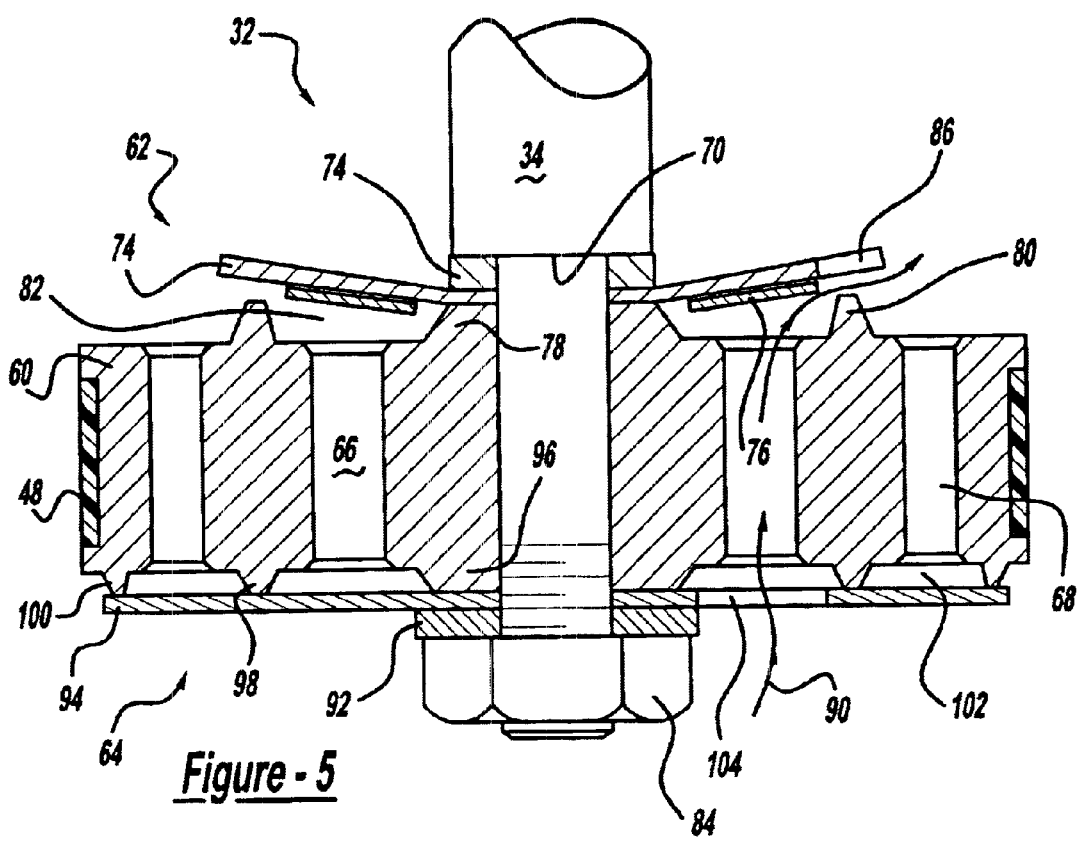
FIG. 5 is an enlarged side elevational view, partially in cross-section, of the piston assembly for the shock absorber shown in FIG. 2 shown in an open, high speed flow mode.

Compression valve assembly 62 is disposed on the upper side of piston 60 adjacent a shoulder 70 defined by piston rod 34. Compression valve assembly 62 comprises a backing plate 72, a compression valve disc 74 and a floating port blocker disc 76. Backing plate 72 is disposed adjacent shoulder 70 on piston rod 34. Compression valve disc 74 is disposed adjacent backing plate 72 on one side and adjacent an inner shoulder 78 and an outer annular land 80 located on piston 60. As can be seen in FIGS. 3-5, outer annular land 80 is taller than inner shoulder 78. This height difference provides a radially outward upper slant for mid/high speed valve disc 74 when it has been assembled. Inner shoulder 78, outer annular land 80, piston 60 and compression valve disc 74 define an annular pressure chamber 82 which is in communication with the plurality of compression passages 66. Floating port blocker disc 76 is a generally planar disc disposed within chamber 82. The inside diameter of blocker disc 76 is guided by the outside diameter of shoulder 78 on piston 60. The outside diameter of blocker disc 76 is guided by the inside diameter of outer annular land 80 on piston 60. Blocker disc 76 is free to float within chamber 82. Neither the inside or outside diameters of blocker disc 76 are fixed. A nut 84 is assembled to the end of piston rod 34 to maintain the assembly of compression valve assembly 62, piston 60 and extension valve assembly 64.

During a compression stroke for shock absorber 20, fluid pressure increases in lower working chamber 46 and fluid pressure decreases in upper working chamber 44. The increase in fluid pressure in lower working chamber 46 is transferred through compression fluid passages 66 to move blocker disc 76 away from piston 60 opening compression fluid passages 66 and then to exert a load on compression valve disc 74 and blocker disc 76. An initial flow of fluid bleeds through a bleed orifice 86 formed in compression valve disc 74 to provide for low speed damping for shock absorber 20 as shown by arrows 88 in FIG. 4. As fluid pressure increases in lower working chamber 46, the pressure differential across compression valve disc 74 and blocker disc 76 will increase. This increase in pressure differential across blocker disc 76 will begin to deflect blocker disc 76 and the fluid pressure differential across compression valve disc 74 will begin to deflect compression valve disc 74 to allow fluid to flow between lower working chamber 46 and upper working chamber 44 as shown by arrows 90 in FIG. 5. The amount of fluid flow will be directly related to the pressure differential across discs 74 and 76 with increased pressure differential causing increased deflection and increased deflection causing an increase in the flow or orifice area.

There are two tuning parameters for blocker disc 76 which have an effect on the generated damping force. First there is the outside diameter of blocker disc 76 and second there is the thickness of blocker disc 76. The outside diameter of blocker disc 76 controls how much of compression fluid passages 66 are covered. The thickness of blocker disc 76 controls the spring rate for blocker disc 76.

Floating port blocker disc 76 provides two functions. First, it provides high speed port restriction that is a function of pressure. Second, it can act as a check valve to eliminate reverse flow through compression fluid passages 66 of piston 60. The present invention provides high speed restriction without affecting the low speed damping force characteristics of piston assembly 32 because blocker disc 76 is allowed to travel a predetermined distance within chamber 82 such that it does not choke fluid flows at low speed. The elimination of reverse flow through compression fluid passages 66 is accomplished only when the outside diameter of blocker disc 76 covers compression fluid passages 66 completely. During high speed fluid flow when compression valve disc 74 deflects, blocker disc 76 functions to reduce the size of the orifice area. The amount of reduction in the size of the orifice area is a function of the displacement of blocker disc 76 and the amount of deflection of blocker disc 76. Deflection of blocker disc 76 is a function of its thickness and the pressure acting on it. Therefore, as the pressure difference across blocker disc 76 increases, the orifice area opened by blocker disc 76 increases. Floating port blocker disc 76 thus functions as a variable high speed orifice.

Extension valve assembly 64 is disposed on the lower side of piston 60 adjacent retaining nut 84. Extension valve assembly 64 comprises a backing plate 92 and an extension valve disc 94. Extension valve disc 94 is disposed adjacent an inner shoulder 96, an inner land 98 and an outer land 100 located on piston 60. Inner land 98, outer land 100, piston 60 and rebound valve disc 94 define an annular pressure chamber 102 which is in communication with the plurality of extension fluid passages 68. Backing plate 92 is disposed adjacent rebound valve disc 94 and retaining nut 84 is disposed adjacent backing plate 92 to complete the assembly of piston assembly 32. Rebound valve disc 94 includes one or more apertures 104 which allow hydraulic fluid to flow into compression fluid passages 66.

During a rebound stroke for shock absorber 20, fluid pressure increases in upper working chamber 44 and fluid pressure decreases in lower working chamber 46. The increase in fluid pressure in upper working chamber 44 is transferred through extension fluid passages 68 to exert a load on rebound valve disc 94. Any flow of fluid through bleed orifice 86 will move blocker disc 76 against piston 60 to close compression extension fluid passages 66. Whether or not any bleed flow of fluid is allowed through bleed orifice 86 and extension fluid passages 66 will be determined by the size of blocker disc 76 and the area, if any, of passages 66 that are left open. As fluid pressure increases in upper working chamber 44 the pressure differential across rebound valve disc 94 will increase. This increase in pressure differential across rebound valve disc 94 will begin to deflect rebound valve disc 74 to allow fluid to flow between upper working chamber 44 and lower working chamber 46.

While extension valve assembly 64 is shown without having a floating port blocker disc, it is within the scope of the present invention to include a floating port blocker disk within chamber 102 along with a bleed port in rebound valve disc 74 if desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper comprising:

a pressure tube forming a working chamber;

a piston disposed within said working chamber, said piston dividing said working chamber into an upper working chamber and a lower working chamber; said piston defining a compression fluid passage and a rebound fluid passage, said fluid passages extending between paid upper working chamber and said lower working chamber;

a first valve disc disposed adjacent said piston to close one passage of said compression fluid passage and said rebound fluid passage, said first valve disc and said piston defining a pressure chamber;

a second valve disc disposed adjacent said piston to close the other passage of said compression fluid passage and said rebound fluid passage;

a free floating disc disposed within said pressure chamber, said floating disc defining an inside diameter, an outside diameter, a first surface extending between said inside and outside diameter facing said first valve disc, and a second surface extending between said inside and said outside diameter facing said piston, said free floating disc movable between a first position where said one passage is closed and a second position where said one passage is open, wherein an open space is defined between said first surface of said free floating disc and said first valve disc when said free floating disc is in said first position, said open space extending over the entire area of said first surface of said free floating disc.

2. The damper according to claim 1, wherein said first valve disc is a compression valve disc closing said compression fluid passage.

3. The damper according to claim 2, wherein said compression valve disc defines a bleed port.

4. The damper according to claim 2, wherein said compression valve abuts a shoulder and an annular land on said piston to define said pressure chamber.

5. The damper according to claim 4, wherein said annular land is taller than said shoulder.

6. The damper according to claim 4, wherein said compression valve disc defines a bleed port disposed adjacent said annular land.

7. The damper according to claim 2, wherein said free floating disc completely closes said compression fluid passage.

8. The damper according to claim 1, wherein said first valve disc defines a bleed port.

9. The damper according to claim 1, wherein said first valve disc abuts a shoulder and an annular land on said piston to define said pressure chamber.

10. The damper according to claim 9, wherein said annular land is taller than said shoulder.

11. The damper according to claim 9, wherein said first valve disc defines a bleed port disposed adjacent said annular land.

12. The damper according to claim 1, wherein said free floating disc completely closes said on passage.

* * * * *

UNITED STATES PATENT AND TRADEMARK OFFICE
CERTIFICATE OF CORRECTION

PATENT NO.    : 6,644,445 B2
DATED         : November 11, 2003
INVENTOR(S)   : Dean R. Dodge It is certified that error appears in the above-identified patent and that said Letters Patent is hereby corrected as shown below:

Column 6,
Line 13, "paid" should be -- said --
Line 64, "on" should be -- one --

Signed and Sealed this

Sixth Day of April, 2004

JON W. DUDAS
*Acting Director of the United States Patent and Trademark Office*